United States Patent
Schreibmueller et al.

(10) Patent No.: US 11,801,894 B2
(45) Date of Patent: Oct. 31, 2023

(54) METHOD AND CONTROL DEVICE FOR DETERMINING AN ORIENTATION OF A TRAILER

(71) Applicant: ZF Friedrichshafen AG, Friedrichshafen (DE)

(72) Inventors: Nicolas Schreibmueller, Meckenbeuren (DE); Mauro Cesar Zanella, Friedrichshafen (DE); David Nieto Lara, Tettnang (DE); Guilherme Lima, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 588 days.

(21) Appl. No.: 16/982,061

(22) PCT Filed: Feb. 27, 2019

(86) PCT No.: PCT/EP2019/054784
§ 371 (c)(1),
(2) Date: Jan. 6, 2021

(87) PCT Pub. No.: WO2019/179724
PCT Pub. Date: Sep. 26, 2019

(65) Prior Publication Data
US 2021/0094616 A1    Apr. 1, 2021

(30) Foreign Application Priority Data
Mar. 22, 2018  (DE) .................. 10 2018 204 442.2

(51) Int. Cl.
*B62D 15/02*      (2006.01)
*G05D 1/02*       (2020.01)
*B60R 16/03*      (2006.01)

(52) U.S. Cl.
CPC ......... *B62D 15/024* (2013.01); *G05D 1/0212* (2013.01); *B60R 16/03* (2013.01)

(58) Field of Classification Search
CPC ..... B60R 16/03; G05D 1/0212; B62D 15/024
USPC .......................................................... 701/25
See application file for complete search history.

(56) References Cited

U.S. PATENT DOCUMENTS

| | | | |
|---|---|---|---|
| 9,340,228 B2 | 5/2016 | Xu et al. | |
| 10,077,980 B2 | 9/2018 | Banerjee | |
| 10,140,525 B2* | 11/2018 | Lang | B62D 15/024 |
| 10,214,156 B2* | 2/2019 | Moenig | B60R 11/04 |

(Continued)

FOREIGN PATENT DOCUMENTS

| | | |
|---|---|---|
| CN | 101722954 A | 6/2010 |
| CN | 105082910 A | 11/2015 |

(Continued)

*Primary Examiner* — Yazan A Soofi
(74) *Attorney, Agent, or Firm* — LEYDIG, VOIT & MAYER, LTD.

(57) ABSTRACT

A method for determining an orientation of a trailer, the trailer being configured to be coupled to a towing vehicle, includes detecting a relation of movements of at least two wheels of the trailer, upon moving the trailer, with at least one sensor arranged at the trailer for detecting a respective state of the at least two wheels. The method further includes calculating an orientation of a coupling device of the trailer based on the relation of the at least two wheels.

11 Claims, 2 Drawing Sheets

(56) References Cited

U.S. PATENT DOCUMENTS

| | | | |
|---|---|---|---|
| 2002/0003571 A1* | 1/2002 | Schofield | B60S 1/0822 348/148 |
| 2007/0217572 A1* | 9/2007 | Kotowski | G01V 5/0008 378/57 |
| 2010/0096203 A1 | 4/2010 | Freese et al. | |
| 2010/0189226 A1* | 7/2010 | Kotowski | G01T 7/00 378/57 |
| 2015/0158527 A1* | 6/2015 | Hafner | B60D 1/245 701/41 |
| 2015/0203156 A1* | 7/2015 | Hafner | G08G 1/143 701/36 |
| 2015/0321666 A1 | 11/2015 | Talty et al. | |
| 2015/0367885 A1 | 12/2015 | Bruns et al. | |
| 2016/0378118 A1 | 12/2016 | Zeng et al. | |
| 2017/0140228 A1* | 5/2017 | Lang | B60R 1/002 |
| 2020/0047656 A1* | 2/2020 | Woodrough, Jr. | B60P 1/6463 |
| 2022/0032913 A1* | 2/2022 | Delizo | G06T 7/521 |

FOREIGN PATENT DOCUMENTS

| | | |
|---|---|---|
| CN | 106274685 A | 1/2017 |
| DE | 10333998 A1 | 2/2005 |
| DE | 202005020065 U1 | 11/2006 |
| DE | 102013102796 A1 | 9/2014 |
| DE | 102014214141 A1 | 1/2016 |
| DE | 102014114812 A1 | 4/2016 |
| DE | 102015116960 A1 | 4/2016 |
| DE | 102015014799 A1 | 5/2017 |
| EP | 2479086 A2 | 7/2012 |
| EP | 2781378 A1 | 9/2014 |
| EP | 2987663 A1 | 2/2016 |
| JP | 2004185057 A | 7/2004 |
| JP | 2006221278 A | 8/2006 |
| WO | WO 2016058595 A1 | 4/2016 |
| WO | WO 2018162031 A1 | 9/2018 |

* cited by examiner

METHOD AND CONTROL DEVICE FOR DETERMINING AN ORIENTATION OF A TRAILER

CROSS REFERENCE TO RELATED APPLICATIONS

This application is a U.S. National Stage Application under 35 U.S.C. § 371 of International Application No. PCT/EP2019/054784 filed on Feb. 27, 2019, and claims benefit to German Patent Application No. DE 10 2018 204 442.2 filed on Mar. 22, 2018. The International Application was published in German on Sep. 26, 2019 as WO 2019/179724 A1 under PCT Article 21(2).

FIELD

The present disclosure relates to a method for determining an orientation of a trailer which can be coupled to a towing vehicle.

BACKGROUND

In passenger cars, it is known to detect the position of a trailer attached to the passenger vehicle via optical systems or measuring systems integrated into the trailer coupling. However, in the case of other vehicles, in particular given commercial vehicles, position detection with such a sensor system may be problematic due to contamination of the optics by grease, or abrasion in the trailer coupling. In the case of commercial vehicles, high mechanical loads on the trailer coupling may also arise, which moreover makes it more difficult to provide sensors on the utility vehicle.

SUMMARY

In an embodiment, the present invention provides a method for determining an orientation of a trailer configured to be coupled to a towing vehicle. The method includes detecting a relation of movements of at least two wheels of the trailer, upon moving the trailer, with at least one sensor arranged at the trailer for detecting a respective state of the at least two wheels, and calculating an orientation of a coupling device of the trailer based on the relation of the at least two wheels.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
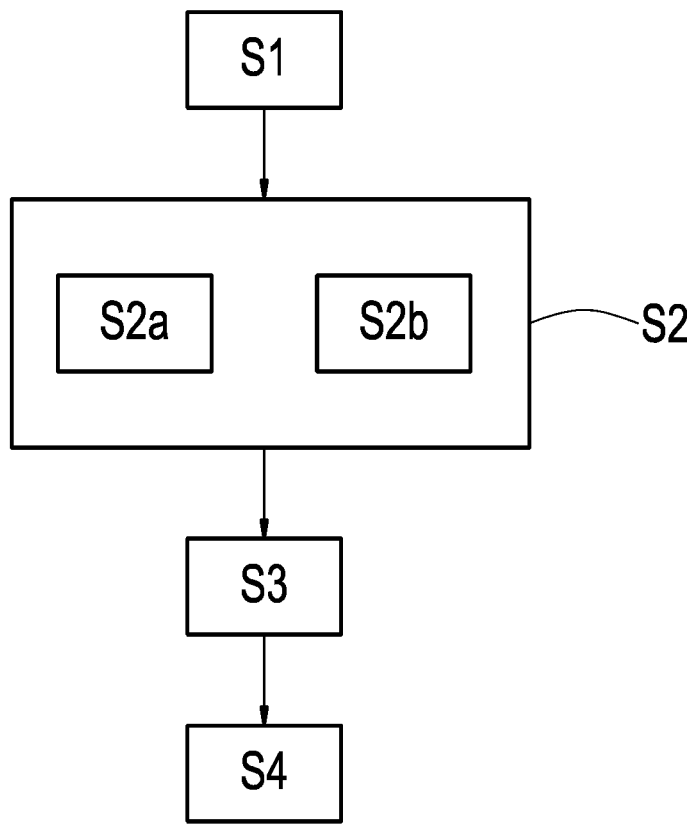
FIG. 1 provide a workflow diagram of an exemplary embodiment of a method for determining an orientation of a trailer which can be coupled to a towing vehicle.

The present disclosure provides solutions for more reliably determining the orientation of a trailer which can be coupled to a towing vehicle, in particular independently of the environmental conditions.

Such a solution for a method for determining an orientation of a trailer which can be coupled to a towing vehicle, in particular in a stationary state of the trailer, comprises a detection of a relation of movements of at least two wheels of the trailer, upon moving the trailer, with at least one sensor arranged on the trailer for detecting a respective state of the at least two wheels, and a calculation of the orientation of a coupling device of the trailer based on the relation of the at least two wheels.

The towing vehicle may be any vehicle which is designed to attach and tow a trailer, for example a transport vehicle, a truck, a tractor trailer, a passenger car, a tractor, or a hauler. The towing vehicle may be a self-driving or manually driven vehicle, wherein it may in particular be an autonomously driving transport vehicle.

The trailer may be any vehicle having a loading area or the like. The trailer may in particular be undriven can be entrained behind the towing vehicle. The towing vehicle and trailer may form a towing pair in a towing operation, wherein the towing vehicle may be the driven or motorized part and the trailer may be the undriven or non-motorized part of the towing pair.

The movement of the trailer may take place during parking or after coupling of the trailer. The movement of the trailer may also take place during travel of the trailer, in particular during a towing of the trailer with a towing vehicle.

The resting state of the trailer may be a stopped state, a parking state, a loading state, or an unloading state. The trailer may hereby be located in a region of a port, for example a container port; of an airport; or on a grounds of a logistics company.

The detected relation of movements of at least two wheels of the trailer upon movement of the trailer may be determined from a first movement of a first wheel of the trailer and a second movement of a second wheel of the trailer. The relation can comprise a difference between respective wheel positions, wheel velocities, or wheel accelerations, wherein respective rotation directions of the wheels may be taken into account.

The sensor for detecting such a relation of movements of at least two wheels of the trailer may be a sensor arranged on a wheel or an axle connecting two wheels. The sensor may, in particular, be a wheel rotational speed sensor which may be an active or passive wheel rotational speed sensor. An active wheel rotational speed sensor can be a proximity sensor with integrated electronics which can evaluate a magnetic field changing in the proximity sensor to detect a rotational speed of a wheel. A passive wheel rotational speed sensor may be an inductive wheel rotational speed sensor that may be mounted over an impulse wheel connected to a wheel hub or drive shaft of a wheel to detect a rotational speed.

A detectable wheel state which may be derived from the detected rotational speed of a wheel rotational speed sensor may be a wheel position, a wheel velocity, a wheel acceleration, or a rotational direction of a wheel.

The calculated orientation of the coupling device of the trailer may be a relative or absolute orientation. The relative orientation may be a relative alignment of the coupling device to a towing vehicle or to a coupling device for coupling the trailer to the towing vehicle. The relative orientation may be an angle between an axis of the coupling device and an axis of the towing vehicle, in particular its longitudinal vehicle axis. The absolute orientation may be an absolute alignment of the coupling device in a superordinate coordinate system.

The coupling device of the trailer may be a drawbar or any other towing and/or steering device on a trailer. To steer the trailer with the coupling device, said coupling device may be arranged on the trailer so as to be able to pivot horizontally and/or vertically.

A core idea of the present disclosure may be seen in the fact that the orientation of a trailer may essentially be determined with a sensor system provided on the trailer. The present disclosure is based on the concept that sensors for detecting wheel states may be arranged on the trailer at non-exposed areas in proximity to the wheels or the wheel axle. This may be advantageous, since such sensors do not need to be directly exposed to mechanical loads on the coupling device. Moreover, such sensors may be shielded from contamination.

One embodiment includes detecting a movement direction and a rotational speed of a first wheel of the trailer, upon moving the trailer, with a first sensor; detecting a movement direction and a rotational speed of a second wheel of the trailer, upon moving the trailer, with a second sensor; comparing the detected movement directions and rotational speeds of the first wheel and the second wheel; and calculating the orientation of the coupling device based on the compared movement directions and rotational speeds of the first wheel and the second wheel. The comparison of the movement directions may have the same or different rotational directions of the wheels as a comparison result. The comparison of the rotational speeds may have a rotational speed difference between the two wheels as a comparison result. The orientation of the coupling device may be calculated based on a known starting position of the two wheels and the determined movement directions and rotational speed differences. The distance traveled by the wheels may hereby be calculated, wherein this may alternatively or additionally also take place with an odometer as a sensor. A time detection of the movement and/or a known wheel circumference may also be required in order to calculate the orientation of the coupling device via the movement behavior of the wheels. The orientation of the trailer may correspond to the orientation of the coupling device, in particular when the coupling device is arranged rigidly on the trailer. This may be the case given a single-axle trailer.

Another embodiment includes detecting an alignment of the coupling device relative to a longitudinal axis of the trailer. The coupling device may be arranged on the trailer so as to be pivotable. This may be the case given a two-axle trailer. Additional sensor systems may be provided on the trailer in order to determine a relative alignment of the coupling device to the trailer. In addition to detecting the movement behavior of the wheels, the relative alignment of the coupling device may be taken into account in order to determine the actual orientation of the coupling device.

Another embodiment comprises calculating the orientation of the coupling device in a superordinate coordinate system. An orientation or angle calculated relative to a towing vehicle may be transferred into the superordinate coordinate system by means of a transformation. For this purpose, an absolute orientation present on a towing vehicle may be added to the relative orientation in order to determine the orientation of the coupling device in the superordinate coordinate system. Knowledge of such an orientation has the advantage that the position of the trailer may be evaluated in a geoinformation system. Such a system may be a logistics system, for example.

A further embodiment comprises detecting a steering angle of the towing vehicle upon moving the trailer, and calculating the orientation of the coupling device under consideration of the detected steering angle. The steering angle may be taken into account in the calculation of the orientation and/or in the calculation of a position of the trailer. Information about the relative alignment of a pivotable coupling device to the trailer may also be determined via the steering angle.

A further embodiment comprises detecting the position of the trailer in a superordinate coordinate system. The detection of the position of the trailer may take place with a position detection system, for example a global navigation satellite system (GNSS), wherein a receiver for satellite signals may be arranged on the trailer and/or on the towing vehicle. With the position and orientation of the trailer or of its coupling device in the superordinate coordinate system, for example an official coordinate system or a harbor coordinate system, the position, meaning the location and the alignment, of a parked trailer may be known. This is advantageous for the operation of autonomous towing vehicles, since these may autonomously approach and couple to the parked trailer.

A further embodiment comprises transmitting the calculated orientation of the coupling device to a higher-level data processing system which is capable of communication with a towing vehicle. On the basis of the data processing system, fleet management may be performed of a plurality of towing vehicles which, with autonomous control, may park and couple to trailers whose location is known. The calculated orientation may also be transmitted in an intermediate step to an evaluation unit or a control unit at the towing vehicle.

Another embodiment comprises using the calculated orientation of the coupling device in autonomous operation of a towing vehicle, at least during a coupling process of the towing vehicle to the trailer. During coupling, the towing vehicle may on the one hand drive up to the coupling device of the parked trailer with a coupling device with precise positioning. On the other hand, based on the calculated orientation of the coupling device, the towing vehicle may drive up to the trailer in such a way that a collision with the trailer or the coupling device may be avoided. This is particularly advantageous when the orientation of a pivotable coupling device is in an alignment that is exposed to a longitudinal axis of the trailer. This has advantages for the safety of an autonomous operation of a towing vehicle.

A further solution is a control device for implementing a method for determining an orientation of a trailer which can be coupled to a towing vehicle, in particular in a rest state of the trailer, which comprises detecting a relation of movements of at least two wheels of the trailer, upon moving the trailer, with at least one sensor arranged at the trailer for detecting a respective state of the at least two wheels; and calculating the orientation of a coupling device of the trailer based on the relation of the at least two wheels.

A further solution is a trailer which can be attached to a towing vehicle and which is connected to such a control device. The towing vehicle may in particular be an autonomously driving towing vehicle.

In one embodiment, the trailer has at least one sensor arranged at the trailer for detecting a respective state of at least two wheels of the trailer, and an electrical generator for generating power at the trailer, wherein the sensor and optionally control electronics can be supplied with power. In principle, a power supply present between trailer and towing vehicle may be used for transmitting measurement data of a sensor. However, the sensor may be connected to a dynamo that provides power. This is advantageous since, as a rule, no separate power supply may be provided given trailers. The dynamo may hereby be operatively connected to one or more of the wheels in order to generate electrical power once the trailer is moving. In addition, at the trailer an energy storage may be provided which may supply a sensor with power therefrom. The energy storage may be charged with the energy generated by the dynamo.

Figure 2:
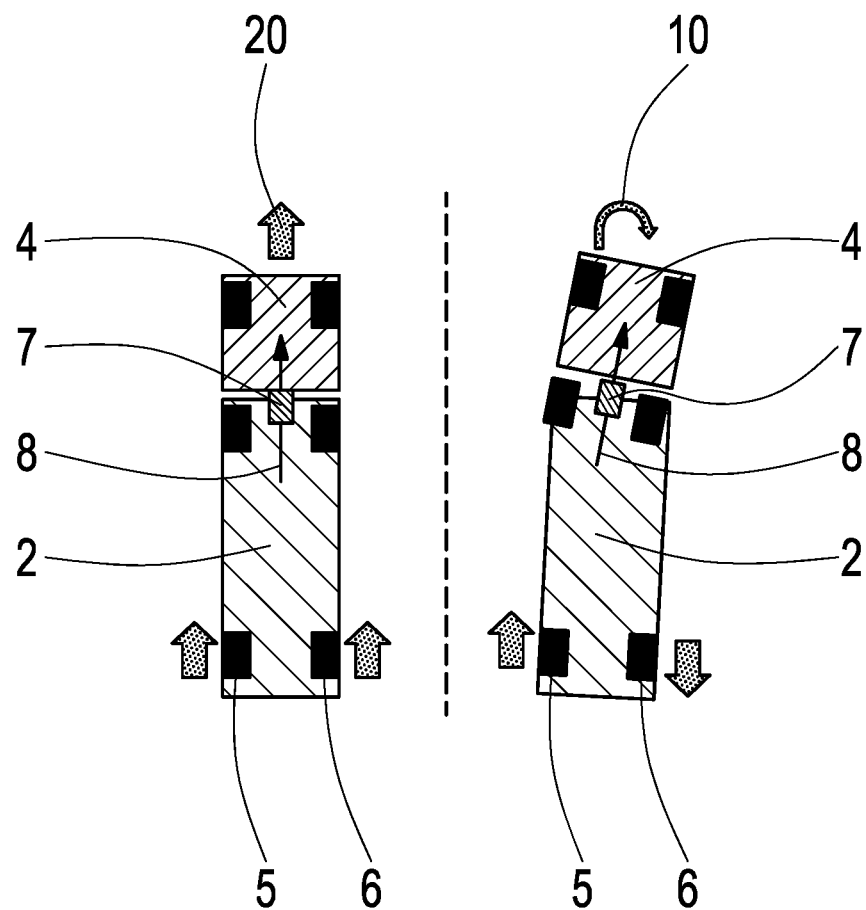
FIG. 2 is a plan view of an embodiment of a trailer for explaining a calculation of an orientation of the trailer upon moving with a towing vehicle.

In FIG. 1, individual method steps S1 to S4 of the method for determining an orientation of a trailer 2 which can be coupled to a towing vehicle 4 are shown in their chronological order. In a first step S1, a movement process of the trailer 2 with the towing vehicle 4 is started in which the wheels 5, 6 of the trailer 2 may be moved as shown in FIG. 2. In a second step S2, the movements of the wheels 5, 6 of the trailer 2 are detected upon moving the trailer 2. In a sub-step S2a, the movement direction and the rotational speed of the first wheel 5 of the trailer 2 upon moving the trailer 2 are detected with a first sensor (not shown). In a further sub-step S2b, the movement direction and the rotational speed of the second wheel 6 of the trailer 2 are detected with a second sensor (not shown) upon moving the trailer 2. In a third step S3, the orientation 8 of a coupling device 7 is calculated on the basis of the movement directions detected in steps S2a, S2b, and the rotational speeds of the first and second wheel 5, 6. In a fourth optional step S4, the orientation 8 of the coupling device 7 is transmitted to a superordinate data processing system (not shown).

In FIG. 2, a towing vehicle 4 with a trailer 2 is shown on the left side, wherein the towing vehicle 2 travels straight ahead 20 upon movement of the trailer 2. Due to travel in a straight line 20, the trailer 2 is moved straight ahead in the direction of travel of the towing vehicle. As a result, the two wheels 5, 6 move in the same direction and at the same rotational speeds.

FIG. 2 shows a towing vehicle 4 with a trailer 2 on the right-hand side, wherein the towing vehicle 2 performs a steering movement 10 upon moving the trailer 2, or is angled relative to a longitudinal axis of the trailer 2. Due to the steering movement 10 to the right, the trailer 2 is moved to the right. In the shown example, the two wheels 5, 6 thereby move at different rotational speeds and, in the extreme case, in different directions. The orientation 8 of the coupling device 7 changes as a function of the movements of the wheels 5, 6.

The determination of the orientation 8 of the trailer 2 attached to the towing vehicle 4 may thus take into account different movement behaviors of wheels 5, 6 in order to efficiently determine an orientation of the trailer 2.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

2 Trailer
4 Towing vehicle
5 First wheel
6 Second wheel
7 Coupling device
8 Orientation
10 Steering movement
20 Straight-ahead travel
S1 Movement process
S2 Movement detection
S3 Orientation detection
S4 Orientation transmission

The invention claimed is:

1. A method for determining an orientation of a trailer configured to be coupled to a towing vehicle, the method comprising:
    detecting a relation of movements of at least two wheels of the trailer, upon moving the trailer, based on one or more signals received from at least one sensor arranged at the trailer for detecting a respective state of the at least two wheels;
    calculating an orientation of a coupling device of the trailer based on the relation of the at least two wheels, wherein the orientation of the coupling device is calculated in a superordinate coordinate system; and
    detecting an alignment of the coupling device with respect to a longitudinal axis of the trailer.

2. The method according to claim 1, further comprising:
    detecting a movement direction and a rotational speed of a first wheel of the trailer, upon moving the trailer, with a first sensor,
    detecting a movement direction and a rotational speed of a second wheel of the trailer, upon moving the trailer, with a second sensor,
    comparing the detected movement directions and rotational speeds of the first wheel and the second wheel, and
    calculating the orientation of the coupling device based on the compared movement directions and rotational speeds of the first wheel and the second wheel.

3. The method according to claim 1, further comprising detecting a steering angle of the towing vehicle upon moving the trailer, and calculating the orientation of the coupling device under consideration of the detected steering angle.

4. The method according to claim 1, further comprising detecting the position of the trailer in a superordinate coordinate system.

5. The method according to claim 1, further comprising transmitting the calculated orientation of the coupling device to a superordinate data processing system which is configured to communicate with a towing vehicle.

6. The method according to claim 1, further comprising using the calculated orientation of the coupling device during autonomous operation of a towing vehicle during a process of coupling the towing vehicle to the trailer.

7. A control device for determining an orientation of a trailer configured to be attached to a towing vehicle, the control device being configured to perform the method according to claim 1.

8. A trailer configured to be attached to a towing vehicle, the trailer being connected to the control device according to claim 7.

9. The trailer according to claim 8, at which is arranged the at least one sensor for detecting the respective state of the at least two wheels of the trailer, the trailer further comprising an electrical generator operatively connected to at least one wheel of the trailer for generating power at the trailer, wherein the sensor is configured to be supplied with power generated by the electrical generator.

10. The method according to claim 1, further comprising evaluating the orientation of the coupling device calculated in the superordinate coordinate system in a geoinformation system.

11. A method for determining an orientation of a trailer configured to be coupled to a towing vehicle, the method comprising:

receiving one or more signals from a sensor arranged at the trailer, the sensor being configured to detect a relation of movement of at least two wheels of the trailer;

determining, based on the received one or more signals from the sensor, an absolute orientation, within a superordinate coordinate system, of a coupling device of the trailer; and determining, based on the received one or more signals from the sensor, a relative alignment of the coupling device with respect to a longitudinal axis of the trailer.

* * * * *